UNITED STATES PATENT OFFICE.

NATHAN C. HARRISON, OF NEWTONVILLE, MASSACHUSETTS.

ABRASIVE MATERIAL AND METHOD OF MAKING SAME.

1,314,061.     Specification of Letters Patent.     Patented Aug. 26, 1919.

No Drawing.     Application filed April 5, 1919. Serial No. 288,377.

*To all whom it may concern:*

Be it known that I, NATHAN C. HARRISON, a citizen of the United States of America, and a resident of Newtonville, in the county of Middlesex and Commonwealth of Massachusetts, have invented certain new and useful Improvements in Abrasive Materials and Methods of Making Same, of which the following is a specification.

This invention relates to abrasive material and the process of manufacturing the same, the object of the invention being to produce artificially a material harder and tougher than corundum and which is adapted for use as a cutting or grinding agent.

The invention consists of a new material formed of diaspore, ground coke and ground iron fused together into a solid crystalline mass.

The invention further consists in the process used in manufacturing said material which consists in mixing ground coke and iron with diaspore, then fusing the mixture in an electric furnace and finally allowing the fused mass to slowly cool until crystallized.

The invention further consists in certain variations in the process of manufacturing the material which will be fully understood by reference to the description of the operation of manufacture and to the claims to be hereinafter given.

One preferred process is herein described, this process having been found to give satisfactory and reliable results, although it is to be understood that the process can be varied in some particulars and that the invention is not limited to the precise process described, except as required by the scope of the appended claims.

In carrying out my improved process for manufacturing abrasive material, the required quantity of diaspore is taken and calcined in any suitable manner until reduced to a powdered state.

This diaspore is then thoroughly mixed with the required quantity of coke previously ground, and the required quantity of ground iron.

It has been found that waste material such as cast iron borings is suitable for this purpose.

When these three materials have been thoroughly mixed, the mixture is placed in an electric furnace and fused in any well-known manner.

The mixture will be melted and formed into a mass of fused aluminium oxid and this is then allowed to cool very slowly, said mass solidifying into crystalline form during the cooling operation.

The amount of the three ingredients used to make a finished ton of abrasive is approximately as follows:

3400 lbs. diaspore.
    400 " iron borings.
    600 " coke.

Obviously these proportions may be varied to a certain extent without departing from the invention.

Moreover, it is self apparent that by varying the time consumed in cooling the fused mass, the product itself will be varied as the slower the product is cooled, the greater will be its toughness and abrasive power owing to the fact that its crystallization will be better defined.

In any case the product will have the same degree of hardness.

The finished product will be a compact, fine grained mass free from pores making an excellent abrasive material harder and tougher than corundum and particularly adapted for use in grinding.

While it is desirable to drive all the water out of the diaspore before placing it in the electric furnace, a very satisfactory result may be obtained by drying the diaspore in the electric furnace.

While the fused mass is being cooled, it may be agitated if desired thereby preventing too rapid crystallization and insuring a finer grain to the finished product.

It has been found in practice that by means of this process a great saving in materials is made and the completed article may be produced in much less time than by any known process.

This is of great advantage as the cost of manufacture is greatly reduced.

The process has another great advantage inasmuch as an article is produced thereby of such fine grain that it is superior for a grinding agent to any known abrasive.

It is believed that the operation and many advantages of the invention will be readily understood without further description.

Having thus described my invention, I claim—

1. An abrasive material composed of diaspore, particles of iron, and ground coke.

2. An abrasive material composed of diaspore, particles of iron, and ground coke and fused together.

3. An abrasive material composed of a mixture of diaspore, ground coke, and ground cast iron borings.

4. An abrasive material composed of a mixture of diaspore, ground coke, and ground cast iron borings electrically fused into a solid mass.

5. An abrasive material composed of a mixture of approximately seventeen parts of diaspore, two parts of ground coke, and three parts of ground cast iron borings.

6. An abrasive material composed of a mixture of approximately seventeen parts of diaspore, two parts of ground coke and three parts of ground cast iron borings, all electrically fused into a solid mass.

7. The process of making abrasive material which consists in grinding coke and particles of iron, mixing said ground coke and iron with diaspore, and then fusing the mixture in an electric furnace.

8. The process of making abrasive material which consists in grinding coke and particles of iron, mixing said ground coke and iron with diaspore in the proportion of seventeen parts diaspore, two parts coke and three parts iron, and then fusing the mixture in an electric furnace.

9. The process of making abrasive material which consists in grinding coke and particles of iron, mixing said ground coke and iron with diaspore, fusing the mixture in an electric furnace, and then slowly cooling the fused mass.

10. The process of making abrasive material which consists in calcining diaspore, then mixing it with ground coke and iron, then fusing the mixture in an electric furnace and finally slowly cooling the fused mass.

Signed by me at 4 Post Office Square, Boston, Mass., this 4th day of April, 1919.

NATHAN C. HARRISON.

Witnesses:
WALTER E. LOMBARD,
NATHAN C. LOMBARD.